US008353154B2

(12) United States Patent
Jacques et al.

(10) Patent No.: US 8,353,154 B2
(45) Date of Patent: Jan. 15, 2013

(54) THERMALLY EFFICIENT EXHAUST TREATMENT SYSTEM FOR AN INTERNAL COMBUSTION ENGINE

(75) Inventors: Robert Lionel Jacques, Troy, MI (US); William A. Bear, Novi, MI (US); Randy L. Dufresne, Orchard Lake, MI (US); Richard Lorenze Johnson, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 215 days.

(21) Appl. No.: 12/692,958

(22) Filed: Jan. 25, 2010

(65) Prior Publication Data

US 2011/0067387 A1 Mar. 24, 2011

Related U.S. Application Data

(60) Provisional application No. 61/244,306, filed on Sep. 21, 2009.

(51) Int. Cl.
*F01N 3/00* (2006.01)

(52) U.S. Cl. ............................................ 60/302; 60/320

(58) Field of Classification Search .................... 60/278, 60/299, 301, 320, 321, 323, 302
See application file for complete search history.

(56) References Cited

U.S. PATENT DOCUMENTS

| | | | |
|---|---|---|---|
| 3,994,130 A | 11/1976 | Sakai et al. | |
| 4,005,576 A | 2/1977 | Nohira et al. | |
| 4,096,691 A | 6/1978 | Nohira et al. | |
| 5,220,789 A | 6/1993 | Riley et al. | |
| 5,881,553 A * | 3/1999 | Steenackers et al. | 60/299 |
| 6,334,306 B1 * | 1/2002 | Mori et al. | 60/297 |
| 7,132,087 B2 * | 11/2006 | Craig et al. | 422/176 |
| 2002/0026909 A1 * | 3/2002 | Akiwa et al. | 123/41.82 R |
| 2004/0226291 A1 * | 11/2004 | Diez et al. | 60/323 |
| 2006/0053782 A1 * | 3/2006 | Kobayashi et al. | 60/302 |
| 2006/0137333 A1 * | 6/2006 | LaBarge et al. | 60/302 |
| 2007/0119156 A1 * | 5/2007 | Hill et al. | 60/302 |
| 2007/0283687 A1 * | 12/2007 | Host et al. | 60/302 |
| 2008/0073065 A1 * | 3/2008 | Samie et al. | 165/96 |

FOREIGN PATENT DOCUMENTS

JP 2009091905 A * 4/2009

* cited by examiner

*Primary Examiner* — Thomas E. Denion
*Assistant Examiner* — Patrick Maines
(74) *Attorney, Agent, or Firm* — Cantor Colburn LLP

(57) ABSTRACT

An exhaust system for an engine comprises a cylinder head having an integral exhaust manifold to collect exhaust gas exiting the engine combustion chambers. An exhaust gas conduit in fluid communication with the exhaust manifold comprises an inlet end connected to the cylinder head, a portion that extends towards an upper end of the internal combustion engine and an outlet end configured to define an inlet end of a multistage catalytic converter. The catalytic converter comprises a canister having an inlet end located adjacent the top of the engine and includes first and second catalyst substrates and a collector closing an outlet end of the canister. The outlet end of the canister is located adjacent to the bottom of the engine, and the first and the second catalyst substrates receive and convert constituents of exhaust gas passing from the inlet end of the canister to the outlet end.

10 Claims, 4 Drawing Sheets

THERMALLY EFFICIENT EXHAUST TREATMENT SYSTEM FOR AN INTERNAL COMBUSTION ENGINE

CROSS REFERENCE TO RELATED APPLICATION

This application claims the benefit of U.S. Patent Application Ser. No. 61/244,306, filed Sep. 21, 2009, the contents of which are incorporated herein by reference thereto.

FIELD OF THE INVENTION

Exemplary embodiments of the present invention relate to exhaust treatment systems for internal combustion engines and, more particularly, to an exhaust system having a thermally efficient configuration.

BACKGROUND

Increases in fuel prices as well as well as in exhaust gas regulations has resulted in an increase in the popularity of alternative propulsion systems for vehicles. Hybrid propulsion systems may utilize a propulsion combination of battery and internal combustion engine. A common operating mode for a battery/internal combustion engine hybrid propulsion system is for the engine to shut off when the vehicle comes to a stop (a traffic stop light, for instance) and then to launch and initially drive the vehicle on battery power until the internal combustion engine is again required to supplant the battery. Such a powertrain system is referred to as a start/stop hybrid propulsion system. One challenge for vehicle designers with such a hybrid propulsion system is the maintenance of appropriate temperatures in the engine, the transmission, the exhaust system and in the passenger compartment during cold ambient temperatures when frequent engine deactivation is occurring (ex. start/stop city driving). One proposed solution to the temperature challenge provided by start/stop hybrid propulsion systems is to utilize a heat recovery system, in association with the engine exhaust system to reclaim waste heat. For example, the engine coolant, or other thermal transfer medium, may be passed through a heat exchanger associated with the engine exhaust system to capture waste heat and supplement the vehicle needs for heat during periods in which the engine is off.

With increasingly stringent emission regulation, exhaust gas after treatment systems have become increasingly complex in size, number of components and cost. Existing after treatment systems typically utilize individual components that each has a discreet function. The components often must be arranged in a particular configuration, and with a particular spacing or separation, at times dictated by the vehicle architecture. The sizes of the individual components and the packaging within vehicle architectures vary, but it is clear that the size and spacing of the components may impose a significant thermal load which operates to rapidly reduce the temperature of exhaust gas passing therethrough and, the waste heat which may be recovered therefrom.

A typical exhaust after treatment system for a gasoline fueled internal combustion engine involves the placement of a catalyst treatment device in close proximity to the exhaust manifold of the internal combustion engine. This catalyst treatment device, referred to as a close-coupled converter, is typically the catalytic device in which most regulated exhaust constituents are converted (>90%). The close coupling to the engine minimizes thermal loss in the exhaust gas, between the engine and the device, resulting in higher temperatures and quicker catalytic activation since the catalyst compounds that are typically used for treating engine exhaust gas operate best at temperatures in excess of 350° C. A second catalyst treatment device, often referred to as an under floor converter is typically placed some distance from the close coupled converter and, as the name implies, often under the floor of the vehicle, behind the engine. In the case of an internal combustion engine having front-exiting exhaust ports, the distance between the close coupled converter and the under floor converter can be 1 meter or more. Such a distance will result in substantial heat loss from the exhaust gas prior to its entry into the second, under floor converter. Such undesirable heat loss operates to reduce the effectiveness of the under floor converter and, substantially reduces the heat available downstream of the under floor converter for recapture by a heat exchanger which, by necessity must be placed downstream of both catalyst treatment devices so as to maximize available exhaust gas heat for their operation.

SUMMARY OF THE INVENTION

In an exemplary embodiment of the present invention, an exhaust treatment system for an internal combustion engine comprises a cylinder head mounted to an internal combustion engine and having a series of integrally cast exhaust gas conduits extending from combustion chambers to a central chamber that terminates in an outlet opening to thereby define an integral exhaust manifold operable to collect exhaust gas exiting the combustion chambers for passage therethrough. An exhaust gas conduit is in fluid communication with the central chamber and is configured to receive exhaust gas from the integral exhaust manifold through the outlet opening. The exhaust gas conduit comprises an inlet end connected to the cylinder head and having an upwardly extending portion that extends towards an upper end of the internal combustion engine and an arcuate portion terminating the upwardly extending portion an having an outlet end configured to define an inlet end of a multistage catalytic converter. The multistage catalytic converter comprises a canister having an inlet end located adjacent a top portion of the engine and defined by the outlet end of the arcuate portion of the exhaust gas conduit. The canister further includes a first catalyst substrate located adjacent the inlet end of the canister a second catalyst substrate located adjacent an outlet end of the canister and a collector closing an outlet end of the canister. The outlet end of the canister is located adjacent to a bottom portion of the engine and the first and the second catalyst substrates are configured to receive and convert constituents of exhaust gas passing from the inlet end of the canister to the outlet end.

In another exemplary embodiment of the present invention, an exhaust treatment system for an internal combustion engine comprises a cylinder head mounted to an internal combustion engine and having a series of integrally cast exhaust gas conduits extending from combustion chambers to a central chamber that terminates in an outlet opening in the cylinder head to thereby define an integral exhaust manifold operable to collect exhaust gas exiting the combustion chambers for passage therethrough. An exhaust gas conduit is in fluid communication with the central chamber and is configured to receive exhaust gas from the integral exhaust manifold through the outlet opening. The exhaust gas conduit comprises an inlet end connected to the cylinder head and having an upwardly extending portion that extends towards an upper end of the internal combustion engine and an arcuate portion terminating the upwardly extending portion an having an outlet end configured to define an inlet end of a multistage catalytic converter. The multistage catalytic converter comprises a canister having an inlet end located adjacent a top portion of the engine and defined by the outlet end of the arcuate portion of the exhaust gas conduit. A first catalyst substrate is located adjacent the inlet end of the canister and a second catalyst substrate is located adjacent an outlet end of the canister. A collector closes an outlet end of the canister which is located adjacent to a bottom portion of the engine. The first and the second catalyst substrates are configured to receive convert constituents of exhaust gas passing from the inlet end of the canister to the outlet end. A heat exchanger assembly is in fluid communication with the collector and is configured to receive exhaust gas exiting the multistage catalytic converter and to extract waste heat from the exhaust gas for distribution to engine or vehicle components. A thermal management system is in fluid communication with the heat exchanger and is operable to collect recovered heat from the heat exchanger through thermal transfer fluid flowing therebetween. The thermal management system is configured to supply recovered heat to engine and vehicle components including the engine, a transmission, a vehicle compartment or a combination thereof.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
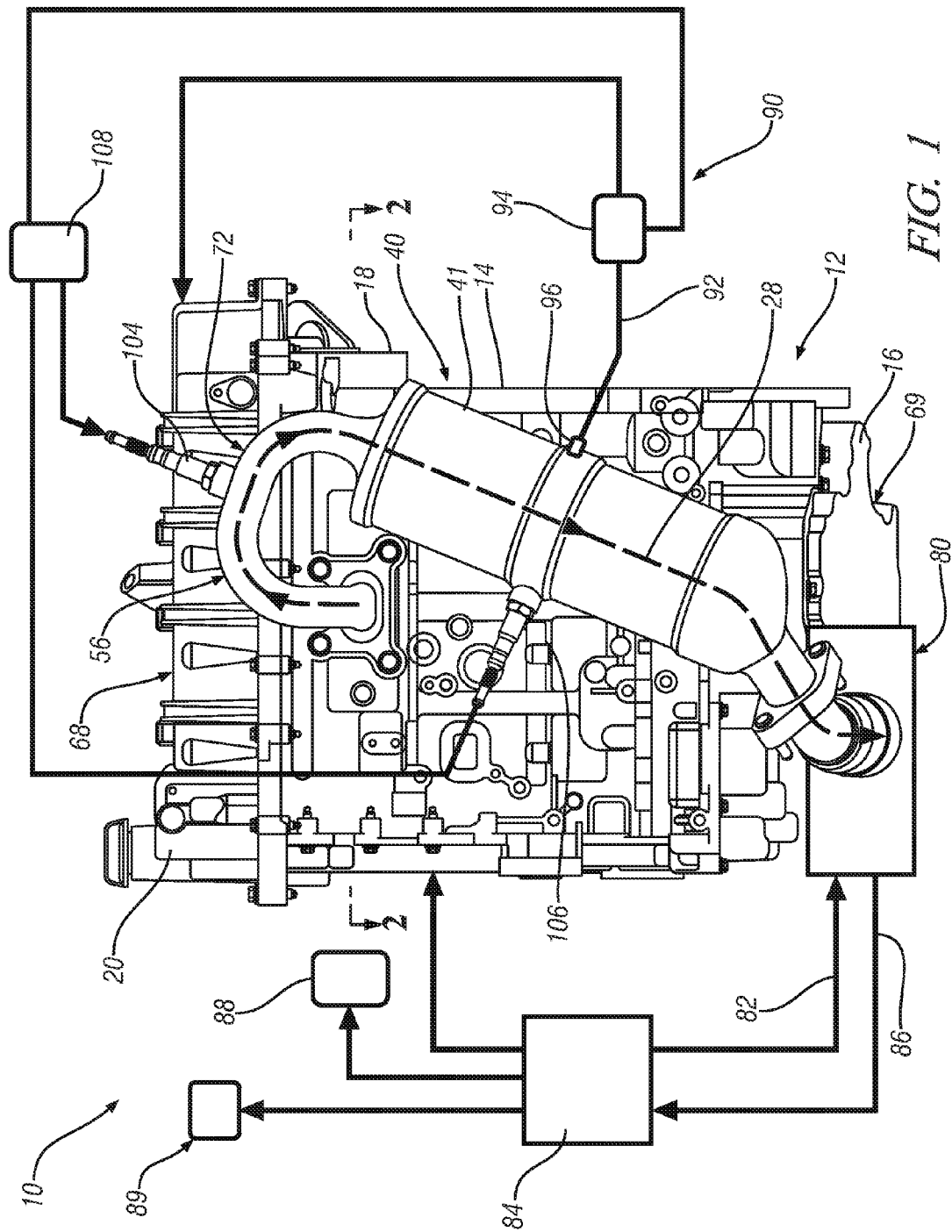
FIG. 1 is a schematic view of an exhaust treatment system for an internal combustion engine embodying features of the present invention.

The following description is merely exemplary in nature and is not intended to limit the present disclosure, application or uses. It should be understood that throughout the drawings, corresponding reference numerals indicate like or corresponding parts and features.

Referring now to FIG. 1, an exemplary embodiment is directed to an exhaust gas treatment system 10, for the reduction of regulated exhaust gas constituents of an internal combustion engine 12. It is appreciated that the internal combustion engine 12 may be one of various configurations and types, such as gas or diesel, in-line or v-configured. For ease of description and discussion, the disclosure will be discussed in the context of an in-line four cylinder gasoline engine. The internal combustion engine 10 includes a cylinder block 14 that is typically constructed of cast iron or a lighter weight alloy such as aluminum. The lower end of the cylinder block 14 is closed by an oil pan 16 while the upper end is closed by a cylinder head 18 and valve cover 20. A combustion air intake system (not shown) and a fuel system (not shown) supply combustion air and fuel to combustion chambers 24, FIG. 2, of the internal combustion engine 12.

Figure 2:
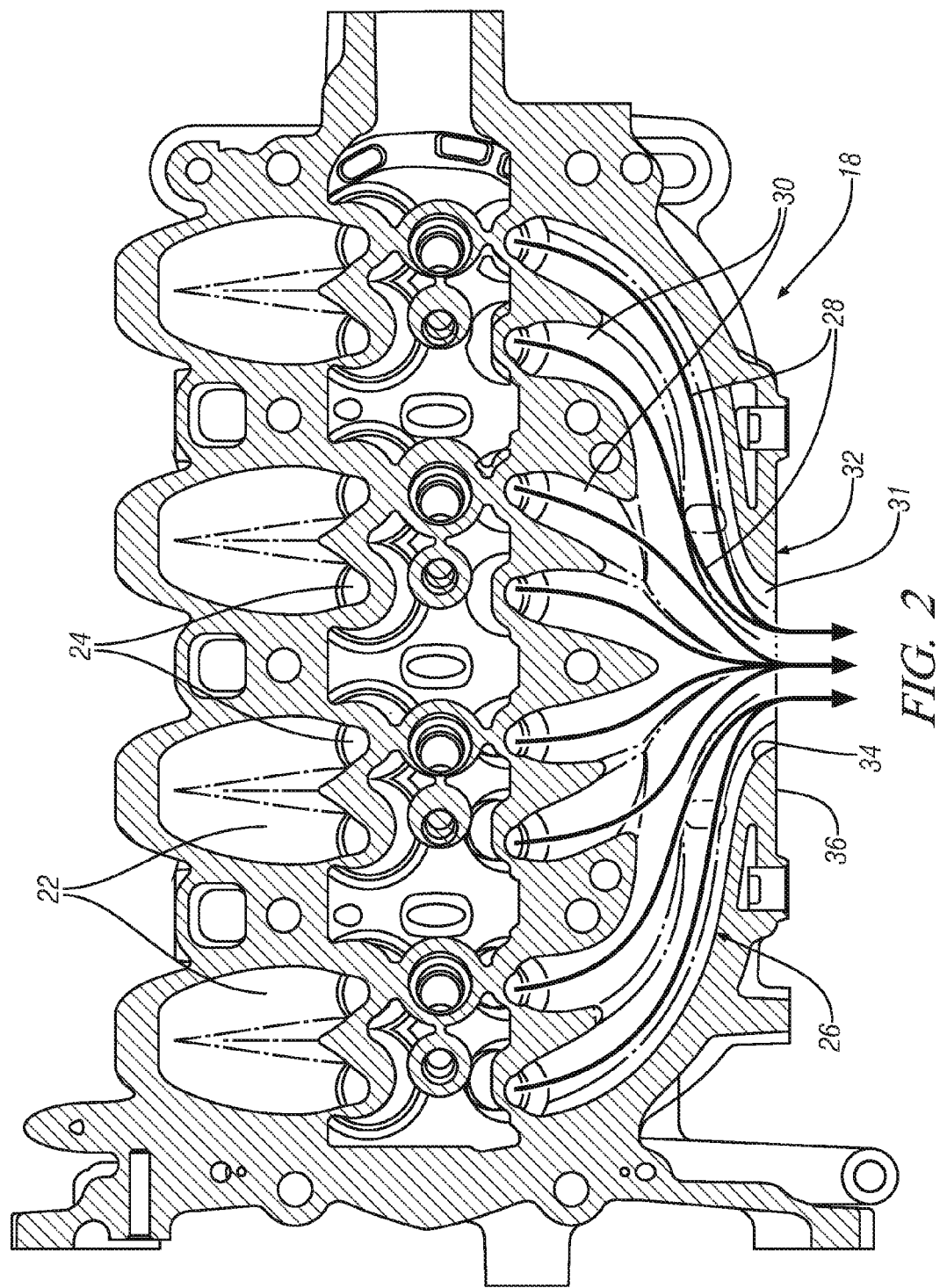
FIG. 2 is a sectional plan view of a cylinder head, taken along line 2-2 of FIG. 1.

In an exemplary embodiment of the cylinder head 18, shown in FIG. 2, a series of intake ports 22 conduct the combustion air to the combustion chambers 24 and an integral exhaust manifold 26 conducts the combustion constituents or exhaust gas 28 therefrom. In an exemplary embodiment, the integral exhaust manifold 26 includes a series of integrally cast exhaust gas conduits 30 which combine at a central chamber 31 adjacent the front side 32 of the cylinder head 18. The central chamber 31 opens through a flanged wall 36 on the cylinder head front side 32 through an outlet opening 34 defined therein. The integration of the exhaust manifold 26, and especially the series of exhaust gas conduits 30, into the cylinder head 18 is an effective way for thermal energy from the exhaust gas 28 to be conserved in the cylinder head 14 and, more specifically, in the exhaust gas 28 of the internal combustion engine 12.

Figure 3:
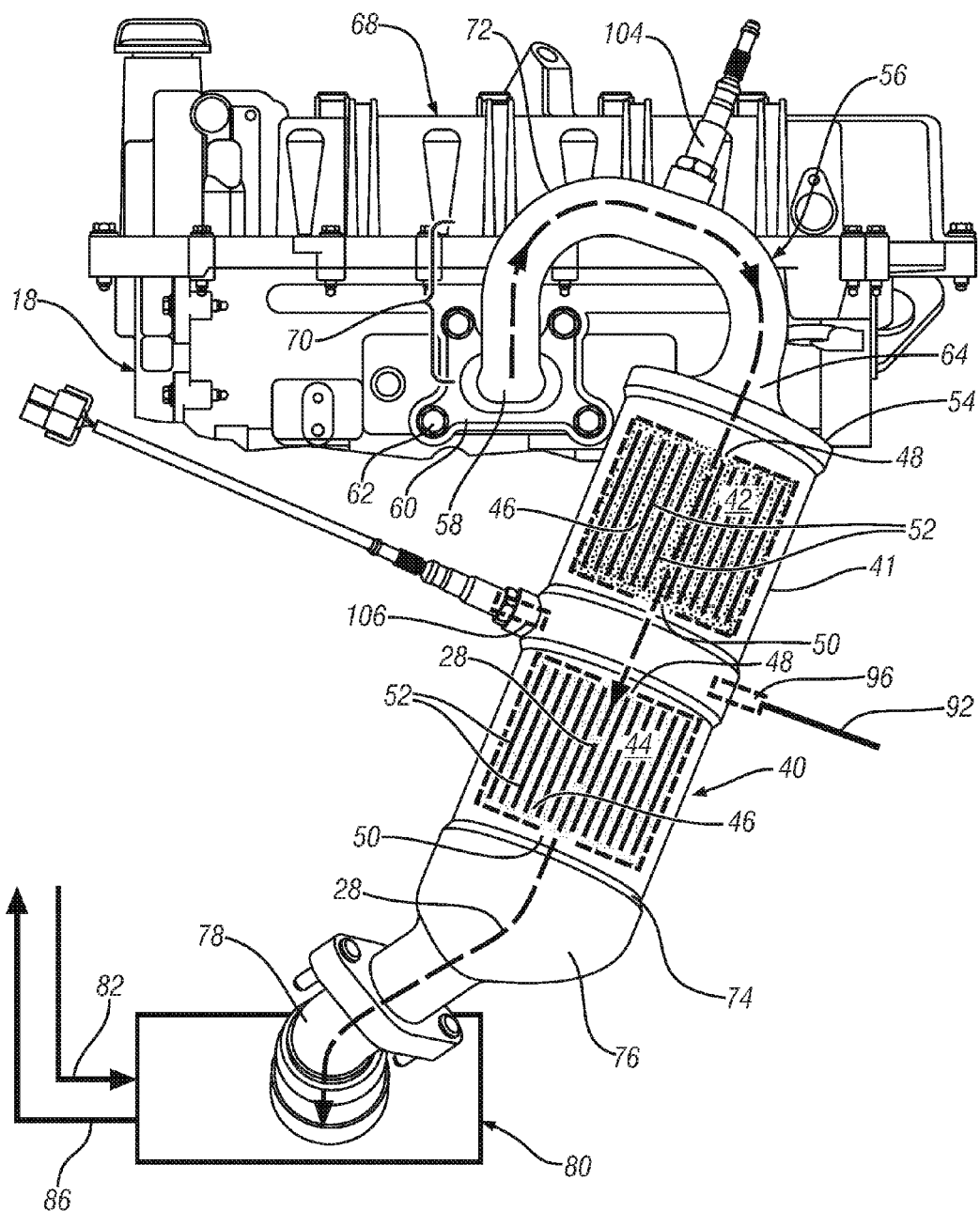
FIG. 3 is an enlarged view of a portion of the exhaust treatment system for an internal combustion engine of FIG. 1.

Referring to FIGS. 1 and 3, in an exemplary embodiment, a multistage catalytic converter 40 includes a canister 41 that is configured to support first and second catalyst substrates 42 and 44, respectively that may comprise a ceramic or metal honeycomb structure. The canister 41 extends in a vertical to off-vertical orientation from a location adjacent to the upper end 68 of the engine 12 to a location adjacent the lower end 69 of the engine 12. Exhaust gas passages 46, that are essentially straight paths from the upstream fluid inlets 48 to the downstream fluid outlets 50 of each substrate 42, 44 are defined by walls 52 on which various catalytic material (not shown) is coated so that the exhaust gas 28 that passes through the catalyst substrates 42 and 44 contacts the catalytic material to thereby initiate a chemical conversion process. For example, in an exemplary embodiment, as the exhaust gas 28 traverses the length of the first catalyst substrate 42 a precious metal or Platinum group metal catalyst compound, including platinum group metals such as platinum (Pt), palladium (Pd), rhodium (Rh) or other suitable oxidizing catalysts, or combination thereof, catalyzes the oxidation of carbon monoxide ("CO") to carbon dioxide ("$CO_2$") in the presence of oxygen ("O2"), reduces oxides of nitrogen ("NOx") to nitrogen ("$N_2$") water ("$H_2O$") and carbon dioxide ("$CO_2$"), as well as catalyzing the oxidation of various hydrocarbons, including gaseous HC and liquid HC particles including unburned fuel or oil, as well as HC reductants that may have been introduced into the exhaust gas stream 28, to form $H_2O$. Again, as the exhaust gas 28 traverses the length of the second catalyst substrate 44 a precious metal or Platinum group metal catalyst compound, including platinum group metals such as platinum (Pt), palladium (Pd), rhodium (Rh) or other suitable oxidizing catalysts, or combination thereof, catalyzes the oxidation of remaining carbon monoxide ("CO") to carbon dioxide ("$CO_2$") in the presence of oxygen ("O2"), reduces oxides of nitrogen ("NOx") to nitrogen ("$N_2$") and water ("$H_2O$") and carbon dioxide ("$CO_2$"), as well as catalyzing the oxidation of various remaining hydrocarbons, including gaseous HC and liquid HC particles including unburned fuel or oil, as well as HC reductants that may have been introduced into the exhaust gas stream 28, to form $H_2O$. The first catalyst substrate 42 includes a higher loading or concentration of the catalyst compound than the second catalyst substrate 44 and is the catalytic device in which most of the regulated exhaust constituents are converted (>90%). The second catalyst substrate 44, having a lighter catalyst loading or concentration is primarily responsible for clean-up of any remaining regulated constituents that may have "slipped" through the first catalyst substrate 42. Other combinations of catalyst compounds are of course contemplated and will be selected based on various parameters such as the type of engine (ex. diesel or gasoline) as well as the application of the engine 12 and/or the vehicle type in which the engine is operated.

Closing a first end 54 of the canister 41 is an inlet conduit 56. In an exemplary embodiment shown in FIGS. 1-3, the inlet conduit 56 includes a first, inlet end 58 that includes a mounting flange 60 that is configured to mount directly to the flanged wall 36 on the front side 32 of the cylinder head 18. The mounting flange 60 may include mounting features (not shown) that receive bolts or other fasteners 62 that engage threaded openings (not shown) in the flanged wall 36 of the cylinder head 18 and operate to secure the inlet conduit 56 and its associated canister 41 to the cylinder head 18. The inlet conduit 56 includes a second, outlet end 64 that closes the inlet end 54 of the canister 41. As a result, the inlet conduit 56 is in fluid communication with the integrally cast exhaust manifold 26 of the cylinder head 18 and operates to receive exhaust gas 28 through the outlet opening 34 in the flanged wall 36 and to conduct the exhaust gas to the inlet end 54 of the canister 41 for passage through the first and second catalyst substrates 42 and 44, respectively.

In an exemplary embodiment, the inlet end 58 of the inlet conduit 56 is configured or oriented to define an upwardly extending portion 70 that extends towards the upper end 68 of the internal combustion engine 12. The extent of the upward directed portion 70 may vary and is likely to be limited by vehicle packaging constraints. At the termination of the upwardly extending portion 70 of the inlet conduit 58, the conduit transitions to an arcuate portion 72 that terminates in a downward oriented direction, with respect to the internal combustion engine 12. The arcuate portion 72 terminates at the second, outlet end 64 of the inlet conduit 56. The upwardly oriented configuration of the inlet conduit 56 of the multi-stage catalytic converter 40 allows the first, inlet end 54 of the canister 41 to be located significantly higher, with respect to the front side 32 of the cylinder head 18 and, consequently the overall length of the canister may be increased (extending virtually from the upper end 68 to the lower end 69 of the engine 12, to easily accommodate the first and second catalyst substrates 42 and 44, together in a close coupled configuration with the exhaust manifold 26.

In an exemplary embodiment, closing the second, outlet end 74 of the canister 41 is a collector 76 that may be configured in a cone or semi-conical configuration to provide a smooth transition of the exhaust gas 28 to the exhaust conduit 78 with which the collector 76 is in fluid communication. The exhaust conduit 78 includes a heat exchanger assembly 80 that is in fluid communication with the exhaust gas 28 exiting the multi-stage catalytic converter 40. The heat exchanger assembly may include a gas to fluid apparatus (not shown) that is configured to receive engine coolant, or other suitable thermal transfer fluid, through a coolant supply conduit 82. The coolant is passed through the heat exchanger assembly 80 where is extracts waste or residual heat from the exhaust gas 28 before being returned to the thermal management system 84 through coolant return conduit 86. Recovered exhaust heat is distributed to various powertrain and vehicle components such as the transmission 88, the engine 12 or the vehicle cabin 89. By moving the second catalyst substrate 44 from an under floor location to a close coupled location using aspects of the invention, the heat exchanger assembly 80 may be located in a near close-coupled location to the exhaust manifold 26 of the internal combustion engine 12 and will benefit from lower heat loss from the exhaust gas 28 and higher recovery of waste or residual heat therefrom.

In an exemplary embodiment, illustrated in FIGS. 1 and 3, an exhaust gas recirculation system ("EGR") 90 may be utilized to recirculate a portion of the exhaust gas 28 back to the intake system (not shown) of the engine 12. The EGR system 90 is a nitrogen oxide ("$NO_x$") emissions reduction technique that uses the diverted inert exhaust gas 28 to decrease the combustion temperatures in the engine to thereby reduce the formation of $NO_x$ which forms much faster at higher temperatures. The EGR conduit 92 is located on, and extends through, the canister 41 where it is in fluid communication with the exhaust gas 28. Locating the EGR conduit 92 between the first and second catalyst substrates 42, 44 respectively, provides an advantage in that the exhaust gas 28 has passed through and been treated by the first catalyst substrate 42 resulting in a more inert gas than if diverted prior to catalytic treatment. In addition, by locating the EGR conduit 92 upstream of the second catalyst substrate 44, the backpressure imposed upon the exhaust gas 28 by the substrate 44 operates to increase the pressure and, as a result, the volume of EGR available to the engine 12. An EGR valve 94, located between the inlet 96 of the EGR conduit 92 and the engine 12 regulates the flow of exhaust gas therethrough.

Oxygen sensors 104 and 106 are in signal communication with a controller such as engine controller 108, or other suitable vehicle controller that is operably connected to, and monitors, the exhaust gas treatment system 10 through a number of sensors. As used herein the term controller refers to an application specific integrated circuit (ASIC), an electronic circuit, a processor (shared, dedicated or group) and memory that executes one or more software or firmware programs, a combinational logic circuit, and/or other suitable components that provide the described functionality. Signals from the oxygen sensors 104 and 106, allow the controller to monitor the conversion efficiency of the multistage catalytic converter 40 and to adjust the fuel, combustion air and EGR to the engine 12, as well as adjusting various engine operating parameters, accordingly.

Figure 4:
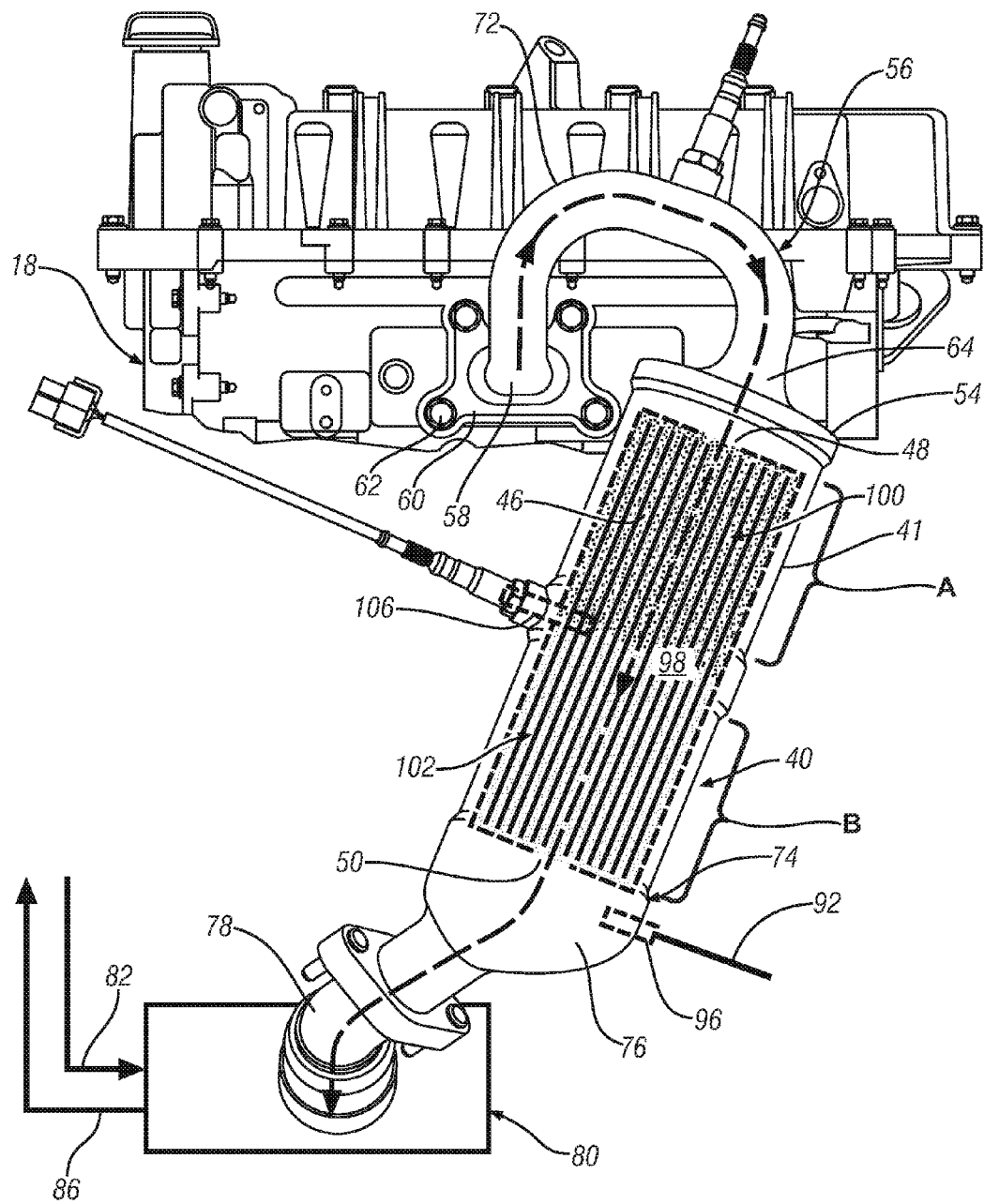
FIG. 4 is an enlarged view of a portion of another embodiment of the exhaust treatment system for an internal combustion engine of FIG. 1.

In an exemplary embodiment, illustrated in FIG. 4, a single catalyst substrate 98 may be installed in the canister 41 of the multistage catalytic converter 40 in place of the first and second catalyst substrates 42 and 44 described above. In the case of single catalyst substrate 98, a zoned catalyst application is utilized to achieve the same emission reduction performance as with the two substrate configuration, already described. Beginning at the upstream fluid inlet 48 of the single catalyst substrate 98 and extending axially downstream, a first catalyst zone 100 of precious metal or Platinum group metal catalyst compound, including platinum group metals such as platinum (Pt), palladium (Pd), rhodium (Rh) or other suitable oxidizing catalysts, or combination thereof, is coated at a first concentration that is effective to catalyze the oxidation of carbon monoxide ("CO") to carbon dioxide ("$CO_2$") in the presence of oxygen ("O2"), reduces oxides of nitrogen ("NOx") to nitrogen ("$N_2$") and water ("$H_2O$") and carbon dioxide ("$CO_2$"), as well as catalyzing the oxidation of various hydrocarbons, including gaseous HC and liquid HC particles including unburned fuel or oil as well as HC reductants that may have been introduced into the exhaust gas stream 28 to form $H_2O$. The first catalyst zone 100 extends a first axial length "A", terminating intermediate of the single catalyst substrate 98 and includes a high enough loading of the catalyst compound to convert most regulated exhaust constituents (>90%) in the exhaust gas 28.

Beginning at the downstream fluid outlet 50 of the single catalyst substrate 98 and extending axially upstream, a second catalyst zone 102 of precious metal or Platinum group metal catalyst compound, including platinum group metals such as platinum (Pt), palladium (Pd), rhodium (Rh) or other suitable oxidizing catalysts, or combination thereof, is coated at a first concentration that is effective to catalyze the oxidation of carbon monoxide ("CO") to carbon dioxide ("$CO_2$") in the presence of oxygen ("O2"), reduces oxides of nitrogen ("NOx") to nitrogen ("$N_2$") and water ("$H_2O$") and carbon dioxide ("$CO_2$"), as well as catalyzing the oxidation of various hydrocarbons, including gaseous HC and liquid HC particles including unburned fuel or oil as well as HC reductants that may have been introduced into the exhaust gas stream 28 to form $H_2O$. The second catalyst zone 102 extends a second axial length "B", terminating intermediate of the single catalyst substrate 98 and includes a high enough loading of the catalyst compound to convert any remaining, or slipped regulated exhaust constituents in the exhaust gas 28 that were not converted while transiting the first catalyst zone 100. In the case of a multi-stage catalytic converter 40 utilizing a zoned, single catalyst substrate 98, it may be necessary, or desirable, to embed an oxygen sensor 106 in the substrate, particularly at or adjacent to the transition from the first catalyst zone 100 to the second catalyst zone 102 in order to monitor the conversion efficiency of the device. Recirculated exhaust gas may, in an exemplary embodiment, be diverted via an EGR conduit 92 having an inlet 96 adjacent to the downstream fluid outlet 50. At such a location, the EGR system benefits from the exhaust gas 28 undergoing an additional conversion event in the second catalyst zone 102. In addition, by locating the EGR conduit 92 upstream of the heat exchanger assembly 80, the backpressure imposed upon the exhaust gas 28 by the heat exchanger assembly operates to increase the pressure and, as a result, the volume of EGR available to the engine 12.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust treatment system for an internal combustion engine comprising:
    a cylinder head mounted to an internal combustion engine and having a series of integral exhaust gas conduits extending from combustion chambers to a central chamber that terminates in an outlet opening in the cylinder head to thereby define an integral exhaust manifold in the cylinder head that is operable to collect exhaust gas exiting the combustion chambers for passage therethrough;
    an exhaust gas conduit in fluid communication with the central chamber and configured to receive exhaust gas from the integral exhaust manifold through the outlet opening, the exhaust gas conduit comprising:
    an inlet end connected to the cylinder head and having an upwardly extending portion that extends towards an upper end of the internal combustion engine;
    an outlet end terminating the upwardly extending portion and configured to define an inlet end of a multistage catalytic converter, the multistage catalytic converter comprising:
    a canister having an inlet end located adjacent a top portion of the engine in fluid communication with the outlet end of the exhaust gas conduit, and configured to conduct exhaust gas from the exhaust gas conduit therethrough;
    a first catalyst coated substrate located adjacent the inlet end of the canister;
    a second catalyst coated substrate located adjacent an outlet end of the canister; and
    a collector closing an outlet end of the canister, the outlet end of the canister located adjacent to a bottom portion of the engine, the first and the second catalyst substrates configured to receive and to convert constituents of exhaust gas passing from the inlet end of the canister to the outlet end thereof.

2. The exhaust treatment system for an internal combustion engine of claim 1, further comprising:
    a heat exchanger assembly in fluid communication with the collector and configured to receive exhaust gas exiting the multistage catalytic converter and to extract waste heat from the exhaust gas for distribution to engine or vehicle components.

3. The exhaust treatment system for an internal combustion engine of claim 1, further comprising:
    a thermal management system in fluid communication with the heat exchanger and operable to collect recovered heat from the heat exchanger through thermal transfer fluid flowing therebetween.

4. The exhaust treatment system for an internal combustion engine of claim 3, wherein the thermal management system is configured to supply recovered heat to engine and vehicle components including the engine, a transmission, a vehicle compartment or a combination thereof.

5. The exhaust treatment system for an internal combustion engine of claim 1, further comprising:
    an exhaust gas recirculation system configured to divert a portion of the exhaust gas transiting the canister to the engine, the exhaust gas recirculation system comprising:
    an exhaust gas conduit having an inlet disposed between the first catalyst substrate and the second catalyst substrate; and
    an exhaust gas recirculation valve for regulating the flow of exhaust gas through the exhaust gas recirculation system.

6. The exhaust treatment system for an internal combustion engine of claim 1, wherein the first catalyst substrate includes a first concentration of a catalyst compound and the second catalyst substrate includes a second concentration of a catalyst compound.

7. The exhaust treatment system for an internal combustion engine of claim 1, wherein the catalyst compound includes platinum group metals such as platinum (Pt), palladium (Pd), rhodium (Rh) or other suitable oxidizing catalysts, or combination thereof.

8. The exhaust treatment system for an internal combustion engine of claim 1, wherein the first catalyst substrate and the second catalyst substrate comprise a single catalyst substrate comprising:
    a first catalyst zone extending axially from a location adjacent to the inlet end of the canister to a location intermediate of the single catalyst substrate; and
    a second catalyst zone extending axially from a location adjacent to the outlet end of the canister to a location intermediate of the single catalyst substrate, the first catalyst zone including a first concentration of a catalyst compound and the second catalyst zone comprising a second concentration of a catalyst compound.

9. The exhaust treatment system for an internal combustion engine of claim 8, wherein the catalyst compound includes platinum group metals such as platinum (Pt), palladium (Pd), rhodium (Rh) or other suitable oxidizing catalysts, or combination thereof.

10. An exhaust treatment system for an internal combustion engine comprising:

a cylinder head mounted to an internal combustion engine and having a series of integrally cast exhaust gas conduits extending from combustion chambers to a central chamber that terminates in an outlet opening in the cylinder head to thereby define an integrally cast exhaust manifold operable to collect exhaust gas exiting the combustion chambers for passage therethrough;

an exhaust gas conduit in fluid communication with the central chamber and configured to receive exhaust gas from the integrally cast exhaust manifold through the outlet opening, the exhaust gas conduit comprising:

an inlet end connected to the cylinder head and having an upwardly extending portion that extends towards an upper end of the internal combustion engine;

an arcuate portion terminating the upwardly extending portion and having an outlet end configured to define an inlet end of a multistage catalytic converter, the multistage catalytic converter comprising:

a canister having an inlet end located adjacent a top portion of the engine and defined by the outlet end of the arcuate portion of the exhaust gas conduit and configured to conduct exhaust gas from the exhaust gas conduit into the canister;

a first catalyst substrate located adjacent the inlet end of the canister;

a second catalyst substrate located adjacent an outlet end of the canister;

a collector closing an outlet end of the canister, the outlet end of the canister located adjacent to a bottom portion of the engine, the first and the second catalyst substrates configured to receive and convert constituents of exhaust gas passing from the inlet end of the canister to the outlet end thereof;

a heat exchanger assembly in fluid communication with the collector and configured to receive exhaust gas exiting the multistage catalytic converter and to extract waste heat from the exhaust gas for distribution to engine or vehicle components; and a thermal management system in fluid communication with the heat exchanger and operable to collect recovered heat from the heat exchanger through thermal transfer fluid flowing therebetween and wherein the thermal management system is configured to supply recovered heat to an engine and vehicle components including the engine, a transmission, a vehicle compartment or a combination thereof.

* * * * *